United States Patent [19]

Walton

[11] Patent Number: 4,813,482

[45] Date of Patent: Mar. 21, 1989

[54] METHOD FOR REMOVAL OF PARAFFIN FROM PRODUCING OIL WELLS

[75] Inventor: William B. Walton, Cleburne, Tex.

[73] Assignee: GAF Corporation, Wayne, N.J.

[21] Appl. No.: 98,425

[22] Filed: Sep. 17, 1987

[51] Int. Cl.$^4$ .................... E21B 43/22; E21B 43/40

[52] U.S. Cl. ........................... 166/267; 166/304; 166/312; 252/8.552

[58] Field of Search ............ 166/267, 304, 312, 371, 166/310, 305.1, 302; 252/8.552

[56] References Cited

U.S. PATENT DOCUMENTS

| | | | |
|---|---|---|---|
| 1,223,659 | 4/1917 | Barnickel | 166/267 x |
| 3,435,898 | 4/1969 | Thompson | 166/274 |
| 4,174,751 | 11/1979 | Compton | 166/267 X |
| 4,207,193 | 6/1980 | Ford et al. | 166/304 X |
| 4,278,129 | 7/1981 | Walton | 166/312 X |
| 4,393,935 | 7/1983 | Walton | 166/312 X |
| 4,541,483 | 9/1985 | Walton | 166/305.1 X |
| 4,668,408 | 5/1987 | McClaflin et al. | 166/304 X |
| 4,706,749 | 11/1987 | Hayes et al. | 166/267 |

Primary Examiner—George A. Suchfield
Attorney, Agent, or Firm—Jules E. Goldberg; Marilyn J. Maue; Joshua J. Ward

[57] ABSTRACT

A method for removing paraffin from a producing oil well comprising (a) contacting a mixture of a paraffin-dispersing effective amount of an alkyl or aralkyl polyoxyalkylene phosphate ester surfactant in the free acid form, or in the form of the alkali metal, amine, or ammonium salt, a mutual solvent and water, said mixture having a temperature of from about 30° to 40° F. higher than the melting point of the paraffin to be removed, with the interior of the oil well for a period of time sufficient to disperse paraffin within the well into the mixture; and (b) removing the mixture and the paraffin dispersed therein from the interior of the well.

12 Claims, 5 Drawing Sheets

METHOD FOR REMOVAL OF PARAFFIN FROM PRODUCING OIL WELLS

BACKGROUND OF THE INVENTION

1. Field of the Invention

This invention relates to oil and gas production wells and particularly to methods for removing paraffin from such wells.

2. Description of the Prior Art

Paraffin formation in producing oil wells, and particularly those wells producing high-paraffin containing oils, significantly interferes with the effectiveness and efficiency of the well production. In severe cases, the presence of paraffin can, in essence, cause the oil production from a given well to cease.

Generally, the paraffin crystallizes out of and solidifies in the well bore, the area surrounding the well bore, the casing and tubing of the well thereby blocking further production.

In the past, attempts have been made to remove the paraffin by mechanically cutting it out of the well or using a so-called "hot-oiling" technique. The cutting procedure is a relatively crude procedure and requires extensive well shutdown time. Moreover, it is extremely inefficient inasmuch as substantial amounts of paraffin remain in the well. This remaining paraffin provides seed crystals which promote the rapid formation of additional paraffin. Consequently, paraffin builds up and the blocking situation quickly occurs again.

In the hot-oiling method, produced crude is heated to a temperature well above the melting point of the paraffin and is then circulated down through the annulus of the well and returned to a hot-oil heating truck via the production tubing. The purpose here is for the hot oil to melt and/or dissolve the paraffin so that it can be removed from the well in liquid form. This is an expensive method since the crude must be put through a heater treater along with a demulsifier in order to facilitate the removal of solids and water therefrom. In this method, the crude oil used is taken from the stock tank and has thus already made one pass through the treating facility and has already been demulsified. Another disadvantage to this method is that in many instances, 100% of the fluid injected is not recovered and thus some is lost to the reservoir.

During the hot-oiling process, a paraffin dispersant which is based on a petroleum sulfonate is added to the crude as it is being heated. The paraffin dispersant assists in dispersing the melted paraffin in the hot-oil phase.

Moreover, this technique is very dangerous, particularly with wells producing a crude having a low flash point. Indeed, such wells cannot be hot-oiled because the auto-ignition temperature of the oil is so low. Thus, bringing the oil in direct contact with a heating mechanism creates a substantial fire hazard.

Another procedure that has been tried is the so-called "hot acid" technique. In this process, an attempt is made to melt paraffin using a combination of hot water, heated xylene and hot acid. However, while this mixture may have some effect on the removal of carbonate scale build-up in wells, it has not presented a satisfactory answer to paraffin removal.

An additional disadvantage of each of the above methods is due to the fact that normally it is desirable to subject a well to acidization at some subsequent point in time after the paraffin removal. The mechanical cutting technique, hot-acid technique, and the hot-oil technique leave the well bore, the area surrounding the well bore, casing and tubing "oil wet". This is a disadvantageous situation for subsequent acidization. In the acidization technique, a mineral acid solution is introduced into the well to remove mineral deposits. The acid solution is aqueous and, if the interior portions and mechanical elements of the well are oil wet, direct contact of these surfaces with the acid solution is inhibited making the acidization treatment much less effective.

Such stimulation of oil and gas wells is a well-known process and is described in detail in U.S. Pat. No. 4,541,483, the contents of which are incorporated herein by reference.

Another problem associated with the prior art processes is that the paraffin which was recovered by mechanical means or by the hot-oil technique had to be dispersed of in a manner consistent with EPA standards of a particular state. This material was not usable for any purpose and represented an economic loss. In some cases, when an attempt to recover the paraffin from a liquid containing it, such as in the hot-oil technique, significant difficulties were encountered. Thus, if paraffin was treated in an attempt to separate it (from a water emulsion thereof), the actual emulsion pad, i.e., that layer of the actual emulsion separating the aqueous from the hydrocarbon layer was so wide as to disrupt the entire system. As a result, it was essentially impossible to separate the fluids from the emulsion.

SUMMARY OF THE INVENTION

I have discovered a method for the removal of paraffin from producing oil wells which avoids the disadvantages of the prior art described hereinabove. Specifically, with the present inventive method, paraffin in a producing oil well can be efficiently and effectively removed in a highly economic manner with minimal well shutdown time. Additionally, with the inventive method, residual seed crystals which promote additional paraffin formation are minimized and the well bore, area surrounding the well bore, casing and tubing, are left "water wet", thus facilitating subsequent stimulation by acidization.

More particularly, the present invention comprises the steps of preparing a mixture of a paraffin dispersing effective amount of an alkyl or aralkyl polyoxyalkylene phosphate ester surfactant in the free acid, alkali metal, amine, or ammonium salt form, a mutual solvent and water. The mixture having a temperature in the range from about 30° to 40° F. greater than the melting point of the paraffin to be removed. Thereafter, the heated mixture is contacted with the interior of the producing oil well for a time sufficient to disperse the paraffin therein in the mixture and to form a micelle emulsion. The mixture and the dispersed paraffin are then removed from the interior of the well.

In addition, the present invention provides a method for recovering the paraffin from the mixture containing the paraffin dispersed therein. This is accomplished by utilizing the micelle emulsion of paraffin which is produced by the present invention and first separating the free water from the micelle emulsion. Thereafter, the micelle emulsion is heated at a temperature from about 120°–180° F. for a period of time sufficient to cause further substantial separation of the emulsion into two phases, namely, a water phase and a hydrocarbon phase, the hydrocarbon phase containing the paraffin. The hydrocarbon phase is easily separated from the water layer. The water thus produced can be injected into an injection well or disposal well for use therein. The hydrocarbon phase represents recovered hydrocarbon and can be further processed as a hydrocarbon product from the well.

DESCRIPTION OF THE PREFERRED EMBODIMENTS

Figure 1:
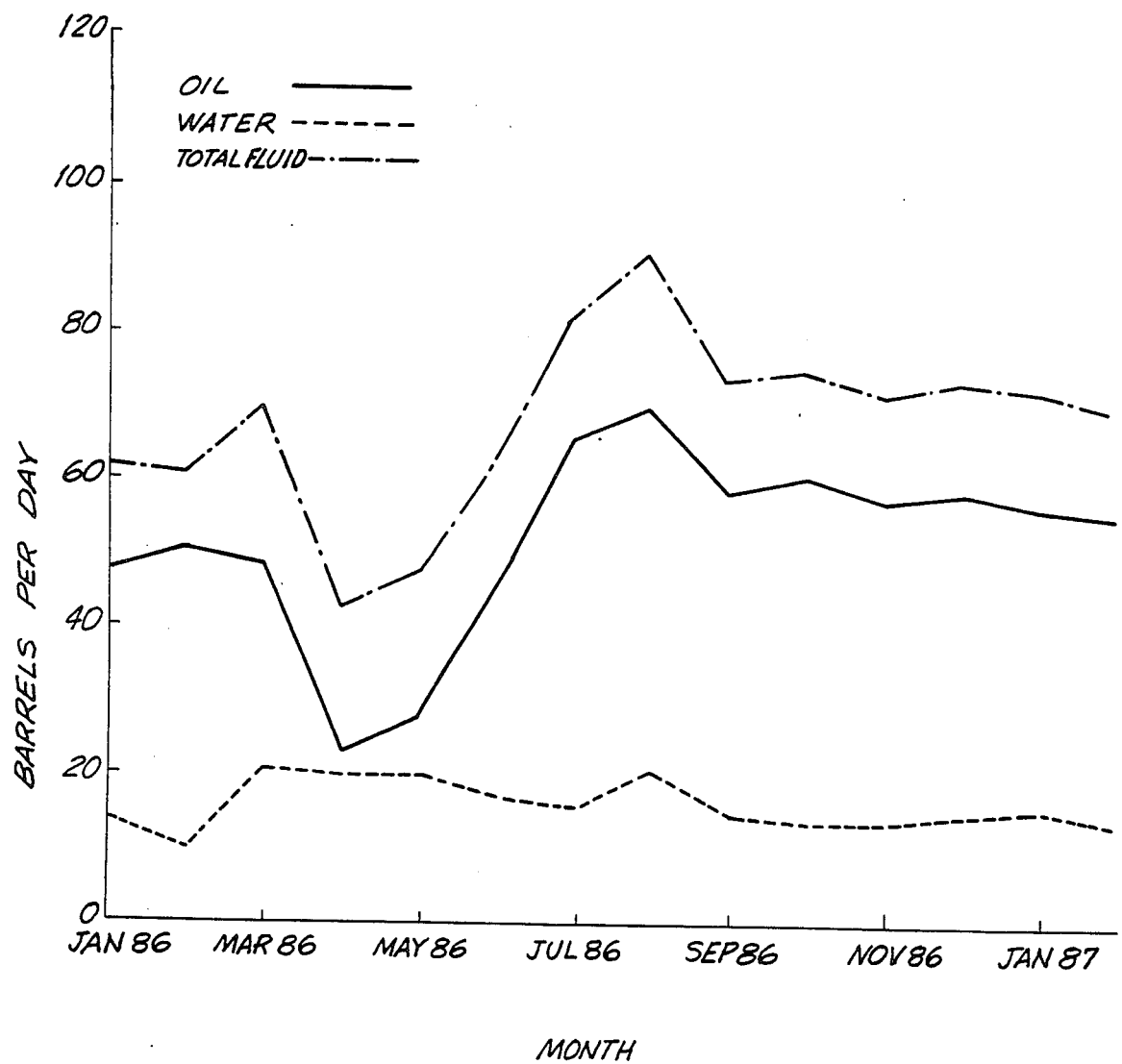
FIG. 1 is a graph depicting well production for the well of Example 2.

Phosphate ester surfactants for use in the present invention are those which are useful in water-flood secondary recovery processes such as disclosed in U.S. Pat. Nos. 3,435,898, 3,596,715 and 3,480,083. Other phosphate ester surfactants which could be utilized include those based on block copolymers (propylene glycol to which propylene oxide and then ethylene oxide have been added), reverse block copolymers (ethylene glycol to which ethylene oxide and then propylene oxide have been added), tetrols (ethylene diamine to which propylene oxide and then ethylene oxide have been added) and reversed tetrols (ethylene diamine to which ethylene oxide and propylene oxide have been added.

Preferred oxyalkylated phosphate esters have the formulas:

$$(OH)_zR_1-O-[(A)_n-O]_x-\overset{O}{\underset{\|}{P}}-(OX)_y, \text{ or}$$

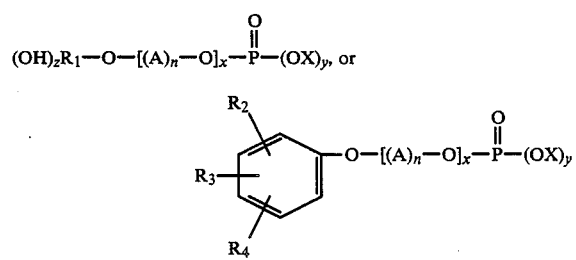

wherein $R_1$ represents an alkyl radical having 10 to 18 carbon atoms, for instance, nonyl, decyl, undecyl, dodecyl, tridecyl, tetradecyl, pentadecyl, hexadecyl, heptadecyl, octadecyl, nonadecyl, eicosyl, uneicosyl, docosyl, tricosyl, tetracosyl, pentacosyl, hexacosyl, and heptacosyl radicals. $R_2$ represents an alkyl of about 5 to 27 carbon atoms, e.g., pentyl, heptyl, hexyl, etc., higher alkyls of the same value as $R_1$, cycloalkyl, e.g., cyclopentyl, cyclohexyl, cycloheptyl, cyclooctyl, methylcyclopentyl, methylcyclohexyl, methylcyclooctyl, methylcyclobutyl, 1,1-dimethylcyclopropyl, ethylcyclopropyl, ethylcyclobutyl, 1-ethyl-2-methylcyclopropyl, 1,1,2-trimethycyclopropyl, 1,2,3-trimethylcyclopropyl, 1,1-dimethylcyclopentyl, 1,2-dimethycyclopentyl, 1,3-dimethylcyclopentyl, 1,2-dimethylcyclohexyl, 1,3-dimethylcyclohexyl, 1,4-dimethylcyclohexyl, ethycyclohexyl, ethylmethylcyclopentyl, 1,1,2-trimethycyclopentyl, cyclononyl, propylcyclohexyl, 1,2,4-trimethylcyclohexyl, 1,3,5-trimethylcyclohexyl, 1-isopropyl-4-methylcyclohexyl, 1,2,4,5-tetramethylcyclohex, and radicals derived from mineral oils containing alkyl, cycloalkyl and mixed alkylcycloalkyl radicals having from about 12 to 27 carbon atoms. $R_3$ and $R_4$ represent either hydrogen, alkyl of from about 1 to 22 carbon atoms, e.g., methyl ethyl, propyl, butyl, and the higher alkyls defined by $R_1$ and cycloalkyls defined by $R_2$ or radicals derived from mineral oils. A represents the residue of ethylene oxide, ethylene oxide and tetrahydrofuran, or mixed lower alkylene oxides selected from the group consisting of ethylene oxide, propylene oxide, and butylene oxide alone or including tetrahydrofuran, wherein the total molecular weight of said ester is about 500 to about 1,500, preferably about 600 to about 1,200, and wherein A can be heteric or block in molecular configuration. The degree of oxyalkylation is represented by n, x and y are 1 or 2, the sum of x and y is 3, and z is an integer of 0 to 5; X is hydrogen or a monovalent cation selected from the group consisting of at least one of an alkali metal, alkyl amine and ammonium. In the formation of the polyhydroxyl oxyalkylene polymer, at least one alkylene oxide or tetrahydrofuran is utilized. Preferably at least 2 alkylene oxides or tetrahydrofuran and one alkylene oxide are utilized. In the formation of said phosphate ester surfactants, alkyl or aralkyl alcohols can be reacted with alkylene oxides in accordance with well known prior art procedures.

The phosphorus acid reactants with which the polyhydroxy oxyalkylene compounds are reacted in the formation of the phosphate esters of the invention can be selected from the group consisting of at least one of phosphorus pentoxide, and polyphosphoric acid. Where the polyhydroxy oxyalkylated compounds are derived from mixtures of lower alkylene oxides or tetrahydrofuran, it is preferred that the compounds be mixtures of ethylene oxide and propylene oxide and that where block or heteric copolymers of these alkylene oxides are formed, it is preferred that the proportion of ethylene oxide be about ten to about ninety percent by weight and the proportion of propylene oxide be about ninety percent to about ten percent by weight. These surfactants can be utilized in the form of mono-, di- and mixed mono- and diphosphate esters. Where the surfactants are utilized in the free acid form, the monoesters are characterized by the formulas above in which X is hydrogen. The surfactants are generally available in anhydrous form or may be prepared to be substantially anhydrous. However, minor amounts of water, generally less than about ten weight percent based on surfactant, may be present and is permissable in the practice of the invention.

Typical block copolymers include mixed mono- and diphosphate esters of a block copoylmer having from about 0 to 90, preferably from about 73 to 85 weight percent ethylene oxide and from about 0 to 30, preferably from about 15 to 27 weight percent propylene oxide, initiated under an aliphatic alcohol having from 10 to 16 carbon atoms and having a molecular weight from about 900 to 1,000 (90% solids in water).

In addition, phosphate esters can be used which are the reaction products of the above-described phosphorus acid reactants with the following diols or tetrols:

1. POLYOL DIOLS.

-continued

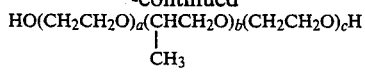
$$HO(CH_2CH_2O)_a(CHCH_2O)_b(CH_2CH_2O)_cH$$
$$|$$
$$CH_3$$

The subscripts a, b, and c are integers and are chosen to fulfill the molecular ranges described below. These compounds are prepared by adding propylene oxide to the two hydroxyl groups of a propylene glycol nucleus with a molecular weight range from about 950 to 4,000. Ethylene oxide is then added to this base to give a molecular weight range of from about 1,100 to 14,000.

2. REVERSE POLYOL DIOLS.

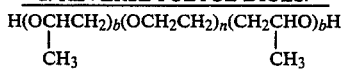
$$H(OCHCH_2)_b(OCH_2CH_2)_n(CH_2CHO)_bH$$
$$|\qquad\qquad\qquad\qquad\qquad|$$
$$CH_3\qquad\qquad\qquad\qquad\;\;CH_3$$

The subscripts b and n are integers and are chosen to fulfill the molecular ranges described below. These compounds are prepared by the sequential addition of ethylene oxide and then propylene oxide to an ethylene glycol base. The molecular weight range of the base is from about 1,000 to 3,100 with a total molecular weight range of from about 1,950 to 9,000.

3. POLYOL TETROLS.

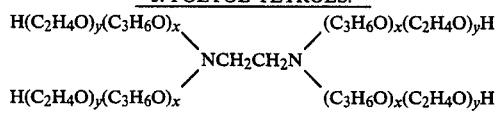

The subscripts x and y are integers and are chosen to fulfill the molecular ranges described below. These compounds are prepared by the addition of propylene oxide and then ethylene oxide to an ethylenediamine base with a molecular weight range of from about 1,650 to about 26,000.

4. REVERSE POLYOL TETROLS.

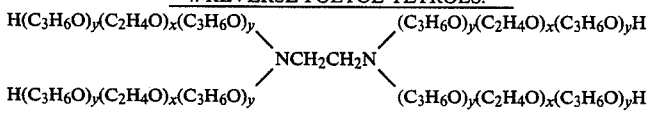

The subscripts x and y are integers and are chosen to fulfill the molecular ranges described below. These can be prepared by the addition of ethylene oxide and then propylene oxide to an ethylenediamine base with a molecular weight range of from about 2,700 to 16,000.

Mutual solvents for use in connection with the invention include those conventional organic solvents which can be either oil or water soluble or blends of each. Typically, this would include a blend of aliphatic and aromatic solvents, and could include alcohols, such as, for example, aliphatic alcohols, glycols, polyglycols and glycol esters as well as mixtures thereof. The alcohols include methanol, ethanol, propanol, isopropanol, 1-butanol, 2-butanol, 1-pentanol, 2-pentanol, 3-pentanol, 1-hexanol, 2-ethylhexanol, 1-heptanol, 2-heptanol, 3-heptanol, 1-n-octanol, 2-n-octanol, nonyl alcohol, 1-decanol and tridecyl alcohol. The solvents further include aromatic hydrocarbon solvents, such as, benzene, toluene, xylene and the like. In general, the solvent or solvent mixture selected will be capable of dissolving from 5 to 50 weight percent of the particular oxyalkylated phosphate ester employed.

The water used for the mixture may be water actually obtained from the well, i.e., produced water, or water brought in from an external source. Optionally, the water may contain or have added thereto an alkali metal salt, e.g., potassium chloride, ammonium chloride, calcium chloride or a combination of calcium chloride and sodium chloride in amounts from 2 to 5 percent by weight based on the weight of the water. Often, the formations of the reservoir contain clay which, upon contacting the water, will swell thus closing of the pores of the reservoir. The added salinity avoids the swelling of the clay and thus minimizes the closing off of the pores.

The mixture may additionally contain optional additives, such as conventional scale-preventive agents. These scale-preventive agents may be a triethanolamine phosphate ester or various phosphonates, namely, diethylenetriaminepenta(methylenephosphonic acid), aminotri(methylenephosphonic acid), aminotri(methylenephosphonic acid) pentasodium salt, 1-hydroxyethylidene-1,1-diphosphinic acid, and ethylenediaminetetra(methylenephosphonic acid). These scale-inhibitor compounds are usually added at the rate of 1 quart per 100 barrels of water to prevent the precipitation of calcium carbonate as the temperature of the well bore and the area surrounding the well bore is increased.

The amount of the paraffin dispersing alkyl or aralkyl polyoxyalkylene phosphate ester surfactant in the free acid, alkali metal, amine or ammonium salt form blended with the mutual solvent may vary widely. Also, the amount of the subsequent paraffin dispersing alkyl or aralkyl polyoxyalkylene phosphate ester surfactant in the free acid, alkali metal, amine or ammonium salt form blended in the mutual solvent blended with the hot water may vary widely. It is only important that a sufficient amount of each be present to effect the desired dispersing of the paraffin and formation of the micelle emulsion. The actual composition may also vary depending on the particular well and crude, since this will determine the amount and characteristics of the paraffin, e.g., melting point, produced as well as its dispersibility.

It is preferred that the amount of the phosphate ester be in the range from about 8 to 35 weight percent, the most preferred range being 15 to 20 weight percent. The amount of mutual solvent preferably is from about 65 to 92 weight percent and most preferably is from about 80 to 85 weight percent. Generally, the water may make up from about 70 to 90 weight percent and most preferably from about 80 to 85 weight percent of the total composition.

A preferable composition for use in accordance with the present invention is one wherein the surfactant is selected from the group consisting of phosphate esters based on fatty alcohol alkoxylates, fatty alcohol ethoxylates, nonylphenol ethoxylates, nonylphenol alkoxylates, block copolymers, reverse block copolymers, tetrols and reverse tetrols, and the like.

The mutual solvent most preferred includes solvents selected from the group consisting of aliphatic and aromatic organic solvents. The most preferred would be a blend of methanol, isopropanol, 2-ethyl hexanol, 2-octanol, nonyl alcohol, tridecyl alcohol, toluene and xylene.

The process of the present invention is carried out by first preparing a mixture of the three essential components as well as any additives which are desired. It is possible simply to mix the components and then subject them to heating, although, for purposes of efficiency and safety, it is more preferrable to first prepare a blend of the alkyl or aralkyl phosphate ester surfactant in the free acid, alkali metal, amine or ammonium salt form with the mutual solvent. This blend of the mutual solvent with the alkyl or aralkyl phosphate ester surfactant in the free acid, alkali metal, amine or ammonium salt form is pumped to a tank truck. The water whether it be produced or fresh, containing the alkali metal salts is heated in a clean hot oil truck to a temperature of about 30° to 40° F. greater than the melting point of the paraffin to be removed. Once brought to temperature, the hot water is pumped over to the tank truck containing the alkyl or aralkyl phosphate ester surfactant in the free acid, alkali metal, amine or ammonium salt form and mutual solvent. The micelle thus created is then pumped into the well bore. Herein lies one of the major advantages and safety aspects of the present invention. Namely, the water, rather than oil, is heated thus avoiding the possibility of flash fires. No flammable organic material comes in direct contact with a heating source.

The process of the present invention may be carried out by first heating the water to a temperature in the range from about 30° to 40° F. greater than the melting point of the paraffin and then mixing the heated water with the combination of the mutual solvent and surfactant. This mixture is then pumped into the well and allowed to remain in contact with the interior of the well and the reservoir for the required amount of the time. Depending upon the paraffin build up, the amount of time may be greater or less, but normally a contact time from about 1 to 12 hours, and preferably from about 2 to 6 hours is used. The resulting micelle emulsion is then flushed out of the well and the paraffin content of the flushed water can be monitored to determine the absence of paraffin at which time the flushing is stopped. In a preferred procedure, a reverse circulation technique is used wherein the mixture is introduced into the annulus of the well between the tubing and the casing. After the desired contact time, the mixture is flushed out of the well by reverse circulation, i.e., circulating the flush liquid into the annulus and exiting the well through the tubing.

Of course, alternative methods for contacting may be used, the important aspect being that the contact time be sufficient so as to allow the paraffin to be completely dispersed in the mixture.

As noted, the present invention further provides a process for recovering the paraffin from the micellular emulsion obtained by the process described hereinabove. In conventional paraffin-removal methods, the paraffin obtained is not in a form for further use. Consequently, it must be disposed of in accordance with the prevailing environmental standards. With the present invention, the paraffin can be recovered in a form which is utilizable as a hydrocarbon product and can be sold as such.

More particularly, with the present invention, the micellular emulsion of paraffin which is obtained from the well is first treated to separate the free water therein from the micellular emulsion. If desired, a demulsifier such as a butyl or nonyl resin or polyol can be added to the micell emulsion. This mixture is then passed through a free-water knockout tank commonly used in oil fields which produces an overall separation of the free water from the micellular emulsion. The micellular emulsion therefrom is passed on to a heating tank (a so-called "heater-treater") also commonly present in oil fields. In the heater-treater, the micellular emulsion is maintained at a sufficiently high temperature for a sufficient period of time to break the micelle emulsion into water and a hydrocarbon layer which contains the paraffin dissolved therein. Typically, the micellular emulsion is held at a temperature from about 100° to 180° F. for a period from about 2 to 24 hours in the heatertreater. The water is thus separated from the hydrocarbon layer. The water can be used as injection water in the oil field and the hydrocarbon containing the dissolved paraffin is normally placed in a tank, such as an oil stock tank, and sold as usable hydrocarbon material.

The following examples illustrate the present invention:

EXAMPLE 1

A series of bottle tests on paraffin from a well located in Wyoming were carried out. The characteristics of the well and produced oil are set forth in Table 1.

TABLE I

| | |
|---|---|
| Well Depth | 1,298 feet |
| Formation | Sand Stone |
| Oil Gravity | 39–40 Degrees API |
| Bottom Hole Temperature (BHT) | 62–65° F. |
| Oil Flash Point | 90° F. |
| Paraffin Pour Point | 60° F. |
| Paraffin Melting Point | 136–142° F. |

The following test procedure was used: A sample of the paraffin from the well was melted and 10 ml of the molten paraffin were added to an 8 oz. bottle. The molten paraffin was allowed to cool and solidify for three hours at 30° F. 13.5 ml. of mutual solvent containing 15 percent by weight of phosphate ester was added to 76.5 ml. of water and heated to 150° F.

The phosphate ester was a mixed mono- and diphosphate ester of a block copolymer of about 75 percent by weight ethylene oxide and about 25 percent by weight propylene oxide initiated with a 10 to 16 carbon aliphatic alcohol and having a molecular weight of about 980 (90 percent solids in water).

A blend of the ester and mutual solvent in hot water was then added to the bottle and the contents were heated for thirty minutes at 150° F. in a water bath. A first blank was prepared of paraffin and hot water, and a second blank containing paraffin, mutual solvent and hot water without the presence of the ester were used for comparative testing.

After the heating step, the bottles were removed from the water bath and shaken 100 times and then set aside to cool. After the bottles had cooled to room temperature, they were placed in a 38° F. water bath for two hours.

During the cooling process the crystallization of the paraffin was observed. The bottles were gently agitated during the cooling process in order to duplicate the conditions existing in a well. The results and observations are set forth in Table 2.

TABLE 2

| Bottle | Paraffin Form |
| --- | --- |
| Paraffin/Hot Water | Paraffin congealed to form one large lump. |
| Paraffin/Hot Water/ Mutual Solvent | Paraffin congealed to form one large lump. |
| Paraffin/Hot Water/ Mutual Solvent with Ester | Paraffin remained in a finely dispersed state. |

After being allowed to stand for fifteen minutes, the sample containing the mutual solvent and surfactant exhibited excellent separation of the paraffin from the water. The separated water was withdrawn from the sample leaving the finely dispersed paraffin in the bottle.

A crude was then added to this bottle along with 350 ppm. of a petroleum sulfonate calcium salt as a paraffin dispersant and the bottle was shaken 100 times. The bottle was then placed in 150° F. water bath for thirty minutes. At the end of the thirty minutes, the bottle was removed and the oil/water separation was observed. The two phases broke within thirty minutes leaving a clean oil phase and a slightly cloudy water phase having a very sharp interface between the two phases.

During the course of a week, this experiment was repeated on four separate days and the same results were observed each time.

These tests show that the use of the surfactant with a mutual solvent and hot water in accordance with the present invention is effective to disperse the paraffin and can be used for those oil well reservoirs which are not sensitive to water.

EXAMPLE 2

Paraffin removal from an operating well.

| WELL DATA: | WELL FW #2 - JUNE 11, 1986 |
| --- | --- |
| Location: | 200'FNL, 200' FWL, Sec. 29, T46N, R98W |
| Elevation: | 5,588' |
| TD: | 1,298' |
| PBTD: | 1,280' |
| Casing: | 8¼", 28# at 97' |
|  | 7", 17# at 1,155' |
| Completion: | Open Hole |
| Capacity: | 7", 17# - 0.0415 bbls/ft |
|  | 2⅜", 4.7# - 0.00387 bbls/ft |

As shown in Table 3, this well was producing 28 bopd. and 20 bwpd. for a total fluid production of 48 bfpd. on May 11, 1986. Its oil production and total fluid production were relatively low for May as compared to the January through March average of the well tests (This data is depicted graphically in FIG. 1). The oil, water, and total production are shown in the drawing. The average indicated 49 bopd. and 15 bwpd. The drop in fluid production indicates that paraffin was building up and causing the pump to slip. This well has not been steamed since November 1985; prior to that it had been steamed three times in 1985 and four times in 1984. The cost of steaming was rather high, namely, $1,600.00 per steaming, or $6,400.00 for the year. Moreover, the steaming only cleaned the tubing and the pump of paraffin. Nothing was done to remove the paraffin from around the face of the well bore and from the area in the reservoir surrounding the well bore.

TABLE 3

WELL PRODUCTION HISTORY - WELL FW #2

| DATE | OIL (BPD) | WATER (BPD) | FLUID (BPD) |
| --- | --- | --- | --- |
| 1986 | | | |
| JANUARY | 48.0 | 14.0 | 62.0 |
| FEBRUARY | 51.0 | 10.0 | 61.0 |
| MARCH | 49.0 | 21.0 | 70.0 |
| APRIL | 23.0 | 20.0 | 43.0 |
| MAY | 28.0 | 20.0 | 48.0 |
| JUNE | 46.0 | 17.0 | 63.0 |
| JULY | 66.0 | 16.0 | 82.0 |
| AUGUST | 70.0 | 21.0 | 91.0 |
| SEPTEMBER | 59.0 | 15.0 | 74.0 |
| OCTOBER | 61.0 | 14.0 | 75.0 |
| NOVEMBER | 58.0 | 14.0 | 72.0 |
| DECEMBER | 59.0 | 15.0 | 74.0 |
| 1987 | | | |
| JANUARY | 57.0 | 16.0 | 73.0 |
| FEBRUARY | 56.0 | 14.0 | 70.0 |

The following procedure was utilized to remove paraffin from the well in accordance with the present invention. This was done on June 11, 1986. The production equipment was removed from the hole and fill was baled out to 1,280 feet. One hundred fifty barrels of fresh water containing two percent potassium chloride and one quart per one hundred barrels of triethanolamine phosphate ester as a scale inhibitor was heated to 160° F.

Initially, heating of the two percent potassium chloride containing water was accomplished in a hot oil truck and heating was begun at 7:15 a.m. The water was heated to 160° F. and pumped into the well beginning at 11:18 a.m. At 11:30 a.m. a fifty-pound pressure on the well annulus was noted. This clearly shows that the well was blocked by paraffin. Reverse circulation was established at 11:37 a.m. and eighteen barrels of water had been pumped up to this time. At 12:30 p.m. the injection of hot water was stopped and the well was shut in for seventy-five minutes.

The mutual solvent was a blend of methanol, isopropanol, 2-octanol and xylene. The ratio of phosphate ester to mutual solvent was 15% to 85%. The phosphate ester used was the same as that for Example 1. Thereafter, a mixture of 250 gallons of mutual solvent/phosphate ester and twenty barrels of heated water containing two percent potassium chloride were pumped into the well beginning at 1:45 p.m. This pumping was completed at 2:15 p.m. and the well was shut in and allowed to soak for one hour.

Circulation was then begun again at 3:15 p.m. and completed at 3:53 p.m. The returns were monitored and the results are shown in Table 4.

TABLE 4

APPEARANCE OF FLUID REMOVED FROM WELL JUNE 11, 1986

| TIME | FLUID APPEARANCE |
| --- | --- |
| 3:15 p.m. | Oil with some melted paraffin in hot water. |
| 3:27 p.m. | Heavy paraffin micellar emulsion (chocolate milk color and consistency) |
| 3:30 p.m. | Heavy paraffin micellar emulsion (light brown in color) |
| 3:34 p.m. | Moderate paraffin micellar emulsion (light tan in color) |
| 3:41 p.m. | Moderate paraffin micellar emulsion (light tan in color) |
| 3:45 p.m. | Moderate paraffin emulsion (light tan in color; not a micellar emulsion) |
| 3:47 p.m. | Dark tan emulsion (basically a water in oil emulsion with some dissolved paraffin) |

TABLE 4-continued

APPEARANCE OF FLUID REMOVED FROM WELL JUNE 11, 1986

| TIME | FLUID APPEARANCE |
|---|---|
| 3:49 p.m. | Cloudy potassium chloride water |
| 4:35 p.m. | Well shut in - Shut in pressure was 50 psig. |

The samples pulled from 3:27 p.m. to 3:47 p.m. showed various oil/paraffin emulsions containing sand and a five to eight percent pad of what appeared to be iron sulfide. After the potassium chloride water appeared to be only cloudy, the well was shut in overnight.

The paraffin micelle emulsion was pumped to a frac tank as it was removed from the well. This emulsion was the transferred by means of a vacuum truck to a treating battery. The treating battery consisted of a free water knockout tank and a heater treater. The emulsion was first pumped into the free water knockout tank where free water was separated from the emulsion. The emulsion was then treated in the heater treater at a temperature of about 135° F. for a time of about 6 hours. This resulted in the production of additional free water and a hydrocarbon product containing dissolved paraffin which represented an overall increase of 40 barrels of oil production.

The production equipment was run back into the well the next day, and production resumed. As shown in TABLE 3, the production of oil and water decreased significantly from March to May. Production from June after the treatment through October showed a significant increase from twenty-eight barrels per day to fifty-nine and more barrels per day. This is an incremental increase of approximately thirty-eight bopd. over the twenty-eight bopd. as observed for May 1986.

EXAMPLE 3

(Comparative Example of "Hot-Acid" Treatment)

A well having the characteristics shown below was treated with the so-called "hot-acid" treatment to remove paraffin build-up therefrom.

TABLE 5

WELL DATA - PW #6

| Elevation | 5,784 feet |
|---|---|
| Total Depth: | 1,030 feet |
| Pump Bottom Total Depth: | 992 feet |
| Perforations: Third Sands: | 824–852 feet (2 shots/foot) |

The perforations were spotted with a hot (100° F.) solution of two percent potassium chloride in water and this was allowed to soak for fifteen minutes. The fluid was removed by swabbing thereafter.

Five hundred gallons of xylene as a solvent was heated and spotted over the perforations and allowed to soak for one hour. Thereafter, utilizing twenty barrels of fresh water containing two percent potassium chloride and one quart per 100 barrels of scale inhibitor heated to 100° F., a flow rate of two barrels per minute or less was instituted in the well producing a well-head pressure of up to 1,000 psi. Six hundred gallons of chemically heated acid at two barrels per minute or less were then introduced producing a maximum well-head pressure of 1,000 psi. Four barrels of heated, two percent potassium chloride containing water were displaced (this volume did not include the pump and lines). It is noted that the acid was heated utilizing the exothermic reaction between anhydrous ammonia and the hydrochloric acid. This reaction raised the temperature of the acid from 35° F. to about 130° F. In particular, 600 gallons of twenty-four percent hydrochloric acid were mixed with two gallons of a corrosion inhibitor, one gallon of a surfactant, five pounds per 1,000 gallons of citric acid utilized as an iron-chelating agent, and anhydrous ammonia as the heating agent for the acid. This was displaced with 4 barrels of heated, two percent potassium chloride containing water. After fifteen minutes, an additional ten barrels of heated, two percent potassium chloride containing water were used to overdisplace the previously injected materials.

After an additional hour, the fluid was removed by swabbing, and swabbing was continued until the oil-wet solids content of the swab fluid was less than 0.3 percent. The production equipment was rerun into the well and well production was initiated.

Figure 2:
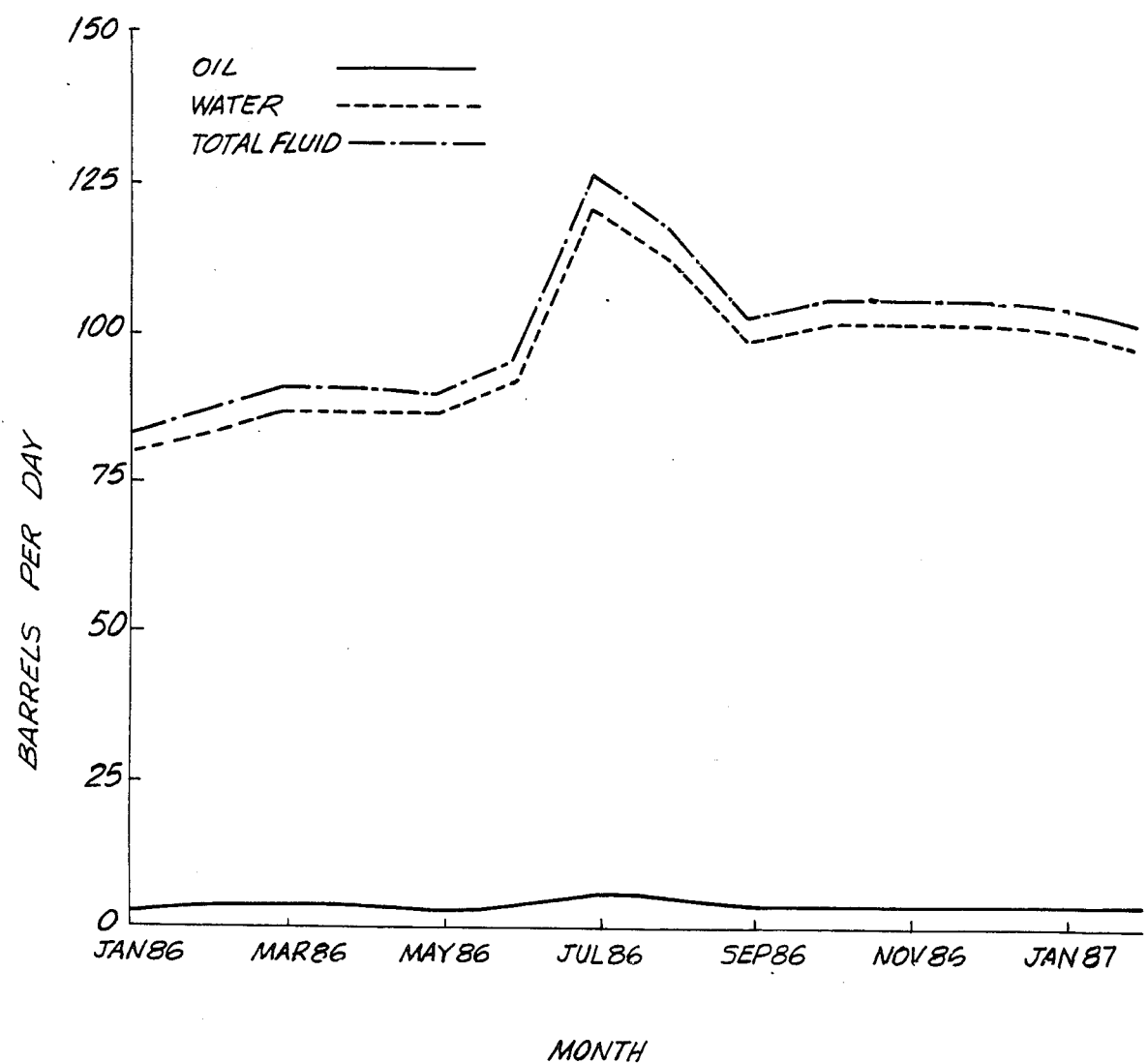
FIG. 2 is a graph depicting well production for the wells of Example 3.

The production history of this well from January 1986 through August 1986 is shown in Table 6 and graphically presented in FIG. 2.

TABLE 6

1986 and 1987 WELL PRODUCTION HISTORY - PW #6

| MONTH | POPD | BWPD | PTFPD |
|---|---|---|---|
| JANUARY | 3.0 | 80.0 | 83.0 |
| FEBRUARY | 4.0 | 83.0 | 87.0 |
| MARCH | 4.0 | 87.0 | 91.0 |
| APRIL | 4.0 | 87.0 | 91.0 |
| MAY | 3.0 | 87.0 | 90.0 |
| JUNE | 4.0 | 92.0 | 96.0 |
| JULY | 6.0 | 121.0 | 127.0 |
| AUGUST | 5.0 | 113.0 | 118.0 |
| SEPTEMBER | 4.0 | 99.0 | 103.0 |
| OCTOBER | 4.0 | 102.0 | 106.0 |
| NOVEMBER | 4.0 | 102.0 | 106.0 |
| DECEMBER | 4.0 | 102.0 | 106.0 |
| 1987 | | | |
| JANUARY | 4.0 | 101.0 | 105.0 |
| FEBRUARY | 4.0 | 98.0 | 102.0 |

Figure 3:
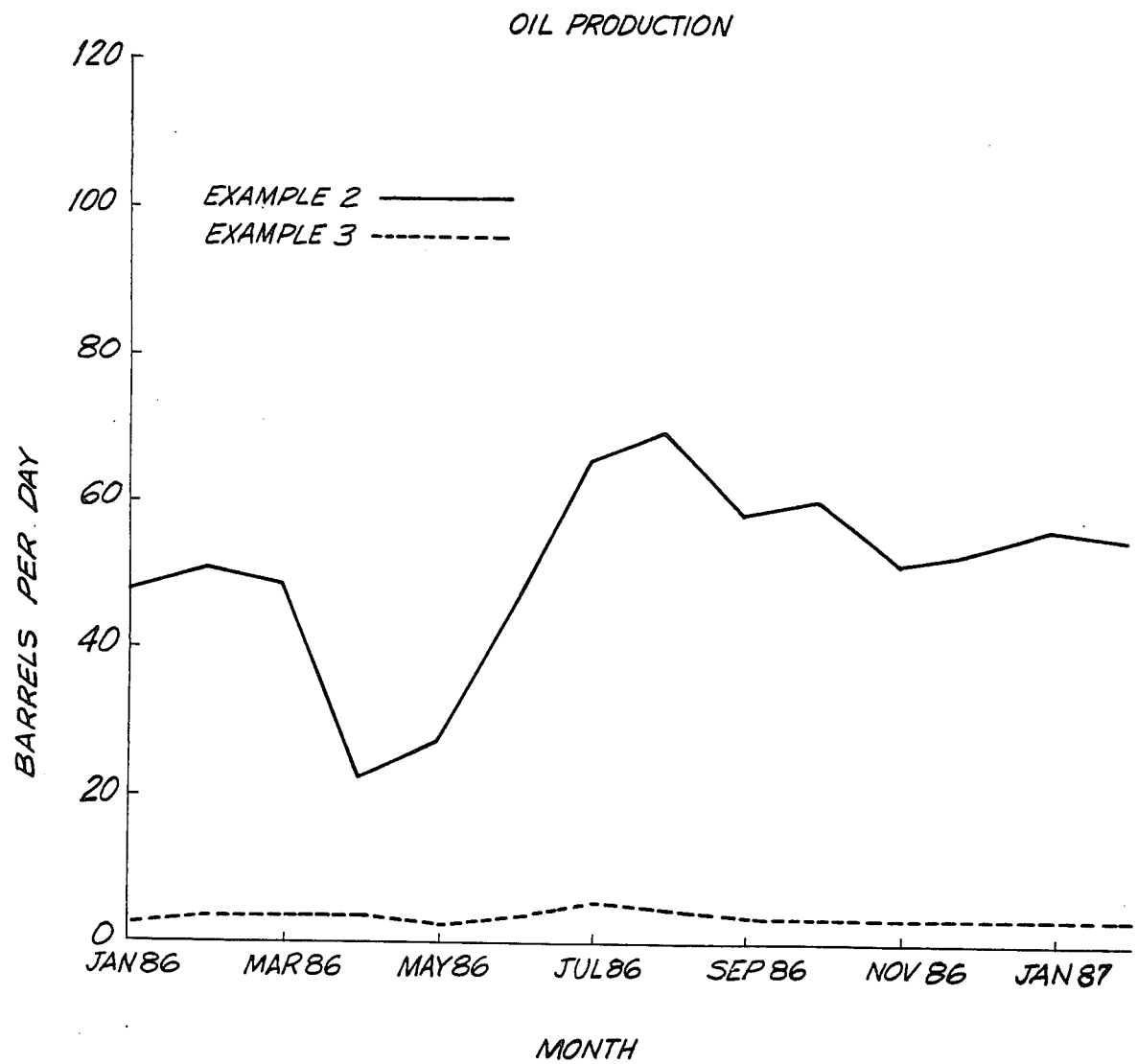
FIG. 3 is a graph depicting a comparison of oil production for the wells of Examples 2 and 3.
Figure 4:
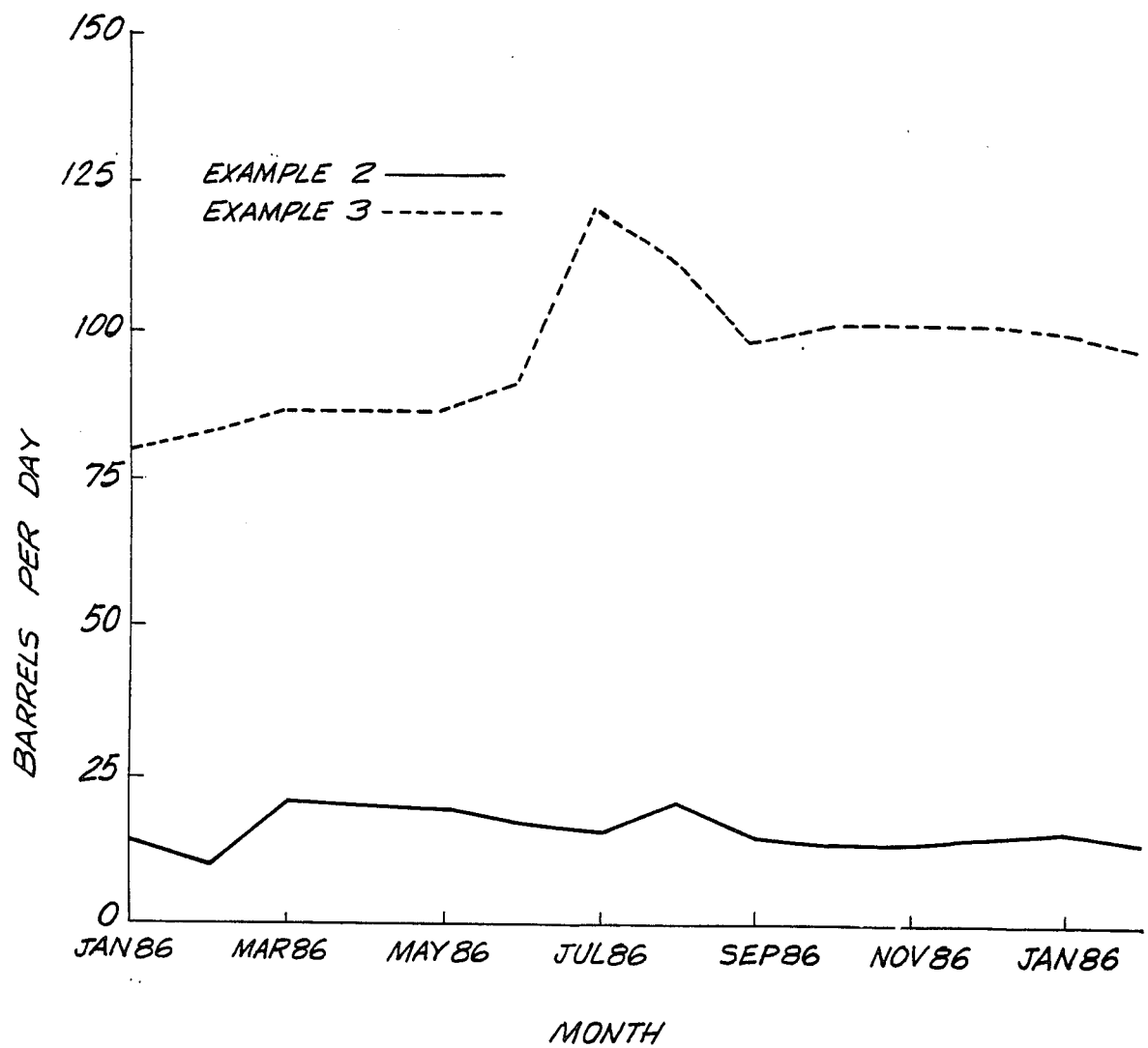
FIG. 4 is a graph depicting a comparison of water production for the wells of Examples 2 and 3.
Figure 5:
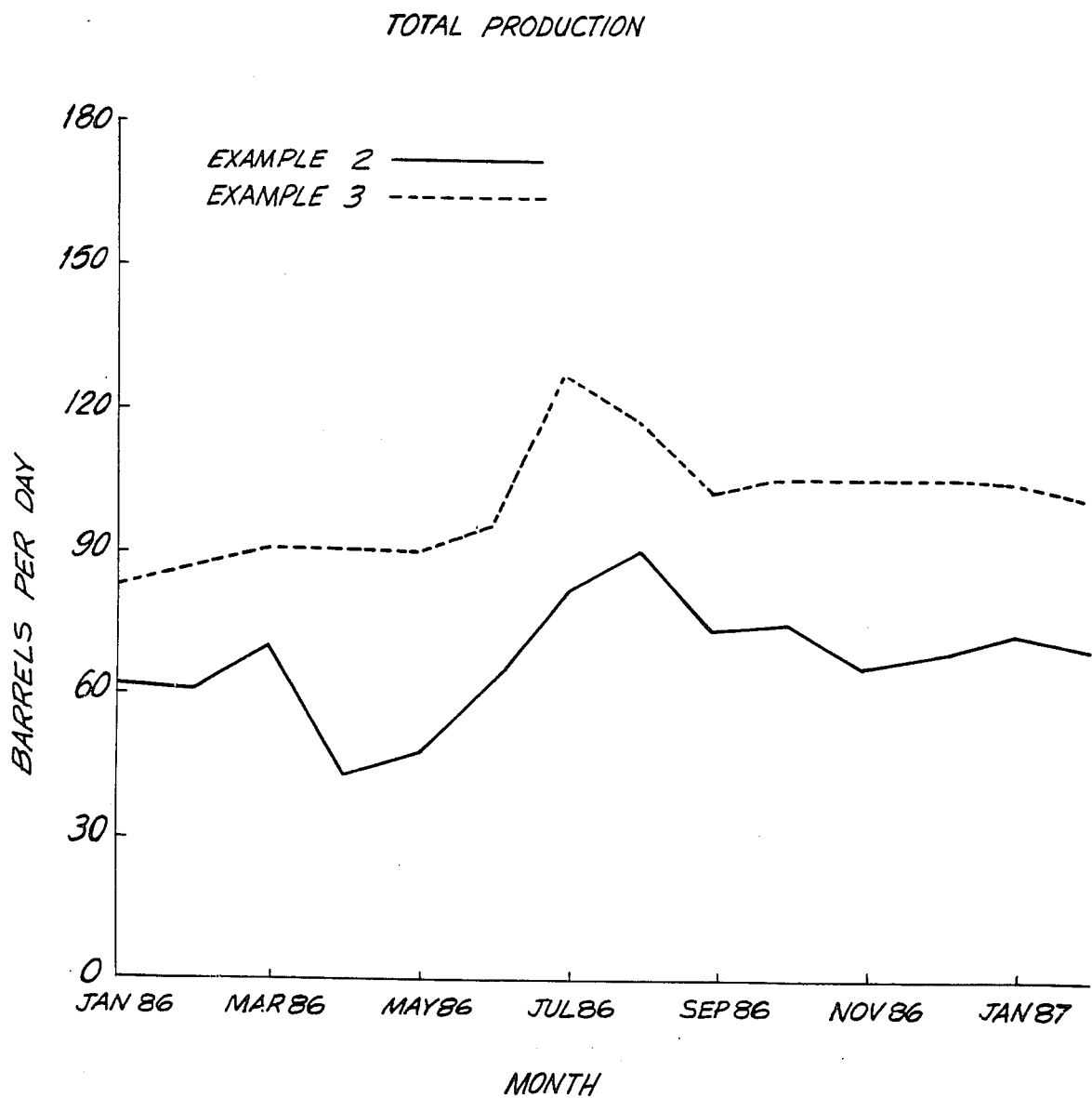
FIG. 5 is a graph depicting a comparison of total production for the wells of Examples 2 and 3.

The above described, hot-acid treatment took place on July 14, 1986. FIG. 3 shows a comparison of the oil production from the well treated in accordance with the present invention, as indicated in Example 2 and the oil production of the well treated in accordance with Example 3. FIG. 4 shows a comparison of the water production from the wells of Examples 2 and 3, and FIG. 5 shows a comparison of the total production from the wells of Examples 2 and 3. As shown in these Figures, the oil, water, and total production for Well PW #2 declined during the time frame July 1986 thru August 1986. In contrast, the well treated in accordance with the procedure of the present invention (Example 2) increased total production and also produced significantly more oil. The comparison makes it clear that the so-called "hot-acid" treatment is not as successful or effective as compared with the present invention in removing paraffin from a producing well and thereby increasing the productivity of the well.

What is claimed is:

1. A method for removing paraffin from a producing oil well comprising the steps of:
    a. preparing a mixture of a paraffin-dispersing effective amount of an alkyl aralkyl polyoxyalkylene phosphate ester surfactant in the free acid form, or in the form of the alkali metal, amine, or ammonium salt; a mutual solvent composed of a blend of an alcohol selected from the group consisting of aliphatic alcohols, glycols, polyglycols and glycol esters and mixtures thereof and an aromatic hydrocarbon selected from the group consisting of benzene, toluene, and xylene, and water and heating said mixture to a temperature of from about 30° to 40° F. higher than the melting point of the paraffin to be removed to form a micelle wherein the micelle mixture contains from about 8 to 35 weight percent of the phosphate ester surfactant, from about 65 to 95 weight percent of the mutual solvent, and from about 70 to 90 weight percent of water;

b. contacting said micelle mixture with the interior of the oil well for a period of time sufficient to disperse paraffin within the well into the mixture; and c. removing the mixture and the paraffin dispersed therein from the interior of the well.

2. The method of claim 1 wherein the phosphate ester surfactant and mutual solvent are first mixed together and then the water component at a temperature in the range from about 30° to 40° F. greater than the melting point of the paraffin to be removed is added to the first formed mixture to form the final heated micelle mixture 3. The method of claim 1 wherein the amount of phosphate ester surfactant is in the range of from about 15 to 20 weight percent, the amount of mutual solvent is in the range of from about 80 to 85 weight percent, and the amount of water is in the range of from 80 to 85 weight percent based on the weight of the total composition.

4. The method of claim 1 or 2 wherein the temperature of the mixture is in the range from about 160° to 180° F.

5. The method of claim 1 or 2 wherein the phosphate ester has the formula:

$$(OH)_zR_1-O-[(A)_n-O]_x-P(=O)-(OX)_y, \text{ or}$$

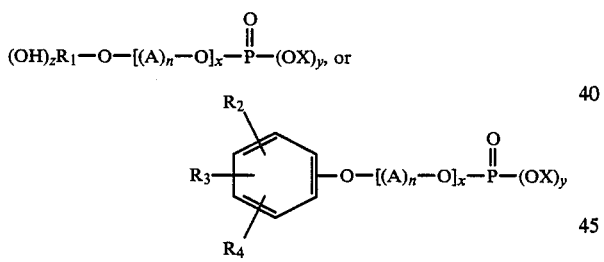

wherein:
$R_1$ represents an alkyl radical having 10 to 18 carbon atoms;
$R_2$ represents an alkyl of about 5 to 27 carbon atoms cycloalkyl, and radicals derived from mineral oils containing alkyl, cycloalkyl and mixed alkylcycloalkyl radicals having from about 12 to 27 carbon atoms;
$R_3$ and $R_4$ represent hydrogen, alkyl having from about 1 to 22 carbon atoms, cycloalkyl, and radicals derived from mineral oils containing alkyl, cycloalkyl and mixed alkylcycloalkyl radicals having from about 12 to 27 carbon atoms;
A represents the residue of ethylene oxide, ethylene oxide and tetrahydrofuran, or mixed lower alkylene oxides selected from the group consisting of ethylene oxide, propylene oxide, and butylene oxide alone or including tetrahydrofuran; and wherein the total molecular weight of the ester is about 500 to about 1,500, and A is heteric or block in molecular configuration; and wherein the degree of oxyalkylation is represented by n; x and y are 1 or 2; the sum of x and y is 3; z is an integer from 0 to 5; and X is hydrogen or a monovalent cation selected from the group consisting of an alkali metals; alkyl amines and ammonium.

6. The process of claim 1 or 2 wherein the phosphate ester surfactant is selected from the group consisting of block copolymers of propylene glycol to which propylene oxide and then ethelyne oxide have been added; reverse block copolymers of ethylene glycol to which ethylene oxide and then propylene oxide have been added, tetrols of ethylenediamine to which propylene oxide and then ethylene oxide have been added, and reverse tetrols of ethylenediamine to which ethylene oxide and then propylene oxide have been added.

7. The process of claim 6 wherein the phosphate ester is selected from the group consisting of the reaction products of a phosphorus acid reactant with a diol or tetrol selected from the group consisting of:
polyol diols having the formula

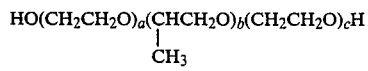

wherein a, b, and c are integers chosen so that the molecular weight of the diol is from about 1,100 to 14,000;
reverse polyol diols having the formula

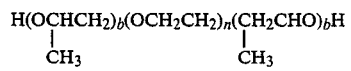

wherein b and n are chosen so that the molecular weight of the diol is from about 1,950 to 9,000;
polyol tetrols having the formula

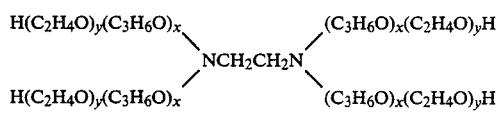

wherein x and y are chosen so that the tetrol has a molecular weight from about 1,650 to about 26,000; and
reverse polyol tetrols having the formula

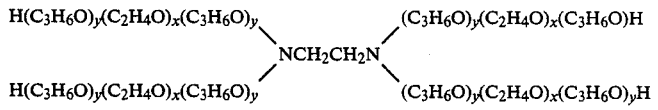

wherein x and y are chosed so that the tetrol has a molecular weight range of from about 2,700 to 16,000.

8. The process of claim 1 or 2 wherein the water contains an alkali metal salt in an amount from about 2 to 5 weight percent based on the weight of the water.

9. A method for the recovery of paraffin solidified in producing oil wells in the form of usable hydrocarbon comprising the steps of:

a. preparing a mixture of a paraffin-dispersing effective amount of an alkyl or aralkyl polyoxyalkylene phosphate ester surfactant in the free acid form, or in the form of the alkali metal, amine, or ammonium salt; a mutual solvent composed of a blend of an alcohol selected from the group consisting of aliphatic alcohols, glycols, polyglycols and glycol esters and mixtures thereof and an aromatic hydrocarbon selected from the group consisting of benzene, toluene, and xylene, and water, and heating said mixture to a temperature of from about 30° to 40° F. higher than the melting point of the paraffin to be removed to form a micelle, wherein the micelle mixture contains from about 8 to 35 weight percent of the phosphate ester surfactant, from about 65 to 95 weight percent of the mutual solvent, and from about 70 to 90 weight percent of water;

b. contacting said micelle mixture with the interior of the oil well for a period of time sufficient to disperse paraffin within the well into the mixture; and c. removing the mixture and the paraffin dispersed therein from the interior of the well;

d. separating the micelle emulsion from any free water therein;

e. heating the separated micelle emulsion at a temperature and time period sufficient to substantially break the micelle emulsion and produce a water layer free of paraffin and a hydrocarbon layer containing the paraffin dissolved therein; and f. separating the water from the hydrocarbon layer from step (e).

10. The method of claim 9 wherein the phosphate ester surfactant and mutual solvent are first mixed together and then the water component at a temperature in the range from about 30° to 40° F. greater than the melting point of the paraffin to be removed is added to the first formed mixture to form the final heated mixture.

11. The method of claim 9 or 10 wherein the micelle emulsion is heated at a temperature of from about 120° to 180° F.

12. The method of claim 9 or 10 wherein the micelle emulsion is heated for a time period of from about 2 to 24 hours.

* * * * *

UNITED STATES PATENT AND TRADEMARK OFFICE
CERTIFICATE OF CORRECTION

PATENT NO. : 4,813,482

DATED : March 21, 1989

INVENTOR(S) : William B. Walton

It is certified that error appears in the above-identified patent and that said Letters Patent is hereby corrected as shown below:

Column 12, line 64, (claim 1) after "alkyl" insert --or--.

Signed and Sealed this

Seventh Day of April, 1992

*Attest:*

HARRY F. MANBECK, JR.

*Attesting Officer*   *Commissioner of Patents and Trademarks*